(12) United States Patent
Yoshioka et al.

(10) Patent No.: US 12,140,169 B2
(45) Date of Patent: Nov. 12, 2024

(54) HARNESS CLAMP

(71) Applicants: TOYOTA JIDOSHA KABUSHIKI KAISHA, Toyota (JP); AISIN CORPORATION, Aichi-ken (JP)

(72) Inventors: Kentaro Yoshioka, Toyota (JP); Koki Akiyama, Kariya (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 27 days.

(21) Appl. No.: 18/091,695

(22) Filed: Dec. 30, 2022

(65) Prior Publication Data

US 2023/0243372 A1 Aug. 3, 2023

(30) Foreign Application Priority Data

Jan. 28, 2022 (JP) ................................. 2022-012390

(51) Int. Cl.
*F16B 2/06* (2006.01)
*H01B 7/00* (2006.01)
*H01B 7/40* (2006.01)

(52) U.S. Cl.
CPC ............. *F16B 2/06* (2013.01); *H01B 7/0045* (2013.01); *H01B 7/40* (2013.01)

(58) Field of Classification Search
CPC ........... F16B 2/06; H01B 7/0045; H01B 7/40; H02G 3/32; H02G 3/02; F16L 3/13; F16L 3/23
See application file for complete search history.

(56) References Cited

U.S. PATENT DOCUMENTS

| | | | | |
|---|---|---|---|---|
| 2,746,112 A | * | 5/1956 | Simon | H02G 3/32 24/457 |
| 3,015,869 A | * | 1/1962 | Rapata | F16L 3/13 24/339 |
| 3,074,675 A | * | 1/1963 | Brown | F16L 3/13 D25/199 |
| 3,245,031 A | * | 4/1966 | Barney | H01R 25/142 439/861 |
| 3,529,795 A | * | 9/1970 | Van Niel | F16L 3/08 248/71 |

(Continued)

FOREIGN PATENT DOCUMENTS

JP 10-041646 A 2/1998
JP 2012-095437 A 5/2012

*Primary Examiner* — Robert Sandy
*Assistant Examiner* — Rowland Do
(74) *Attorney, Agent, or Firm* — Sughrue Mion, PLLC

(57) ABSTRACT

A harness clamp includes a harness clamp body including a base part, an upright part, a fixing part, a folding back part, a first elongated part, and a second elongated part. A distal end of the second elongated part and the upright part define a first gap. A fourth bent part and the base part define a second gap. The base, folding back, and first elongated parts define a first clamp space to clamp a harness. The base, upright, and second elongated parts define a second clamp space to clamp the harness deformed through the second gap from the first clamp space. Where a length of the first gap is A, a length of the second gap is B, a diameter of the harness is φ, and a maximum diameter of the deformed harness is a, a relationship that B<φ and A<a is satisfied.

4 Claims, 3 Drawing Sheets

(56) References Cited

U.S. PATENT DOCUMENTS

| | | | | | |
|---|---|---|---|---|---|
| 3,599,915 | A | * | 8/1971 | Soltysik | F16B 2/065 248/68.1 |
| 4,083,523 | A | * | 4/1978 | Fisher | F16L 3/13 248/74.3 |
| 4,195,807 | A | * | 4/1980 | Llauge | F16L 3/10 24/339 |
| 4,279,396 | A | * | 7/1981 | Bendock | A47K 3/38 248/205.5 |
| 4,369,946 | A | * | 1/1983 | Palmer | F16L 3/13 24/561 |
| 4,623,102 | A | * | 11/1986 | Hough, Jr. | F16L 3/1236 248/68.1 |
| 4,655,424 | A | * | 4/1987 | Oshida | F16L 3/13 248/68.1 |
| D291,532 | S | * | 8/1987 | Hill | D8/382 |
| D307,108 | S | * | 4/1990 | Morita | D8/382 |
| 5,082,225 | A | * | 1/1992 | Nespoli | B60R 7/082 248/902 |
| 5,645,252 | A | * | 7/1997 | Fisher | F16L 3/22 24/297 |
| 6,494,413 | B1 | * | 12/2002 | Saeki | F16L 3/237 24/561 |
| 7,997,773 | B2 | * | 8/2011 | Kraus | H02G 3/24 362/396 |
| D793,476 | S | * | 8/2017 | Tolokan | D19/34 |
| 2008/0078891 | A1 | * | 4/2008 | Hobson | F16L 3/13 248/74.2 |
| 2018/0087692 | A1 | * | 3/2018 | Geiger | F16L 3/04 |

* cited by examiner

HARNESS CLAMP

CROSS-REFERENCE TO RELATED APPLICATION

This application claims priority to Japanese Patent Application No. 2022-012390 filed on Jan. 28, 2022, incorporated herein by reference in its entirety.

BACKGROUND

1. Technical Field

The present disclosure relates to a harness clamp.

2. Description of Related Art

There has been suggested a harness clamp that includes a proximal end integrally provided with a harness mounting face, and holding parts each curved along the outer periphery of a harness from the proximal end to hold the harness in a state of covering the outer periphery of the harness (see, for example, Japanese Unexamined Patent Application Publication No. 2012-095437 (JP 2012-095437 A)). A gap smaller than the diameter of the harness is formed between the distal end of the holding part and the harness mounting face. The harness is inserted through the gap. Thus, the harness is clamped in a state of covering the outer periphery of the harness with the holding parts of the harness clamp.

SUMMARY

However, with the harness clamp described in JP 2012-095437 A, there is an inconvenience that the harness passes through the gap and comes off depending on the use environment of the harness clamp (for example, an environment in which vibrations are applied to the harness clamp).

The present disclosure provides a harness clamp capable of suppressing coming off of a harness.

An aspect of the present disclosure relates to a harness clamp. The harness clamp includes a harness clamp body. The harness clamp body includes a base part, an upright part extending from a first end of the base part in a direction away from the base part via a first bent part, a fixing part extending from a distal end of the upright part toward a side opposite to the base part via a second bent part and fixed to a fixing target, a folding back part folded back from a second end of the base part, a first elongated part extending substantially parallel to the base part from a distal end of the folding back part toward the upright part and further extending in a direction to approach the base part via a third bent part, and a second elongated part extending from a distal end of the first elongated part in a direction away from the base part via a fourth bent part, a distal end of the second elongated part being a free end. The distal end of the second elongated part and the upright part define a first gap. The fourth bent part and the base part define a second gap. The base part, the folding back part, and the first elongated part define a first clamp space. The first clamp space is a space to clamp a harness. The base part, the upright part, and the second elongated part define a second clamp space. The second clamp space is a space to clamp the harness deformed as a result of passing through the second gap from the first clamp space. Where a length of the first gap is A, a length of the second gap is B, a diameter of the harness is $\phi$, and a maximum diameter of the deformed harness is a, a relationship that $B<\phi$ and $A<a$ is satisfied.

With this configuration, it is possible to suppress coming off of the harness.

This is due to the fact that the harness clamp is provided with a plurality of clamp functions, that is, a first clamp space that functions as a first clamp and a second clamp space that functions as a second clamp.

In the above harness clamp, the folding back part may extend in a circular arc shape, and a diameter of the folding back part may be substantially equal to the diameter of the harness.

In the above harness clamp, the harness clamp body may be manufactured by bending a metal plate.

According to the aspect of the present disclosure, it is possible to provide a harness clamp capable of suppressing coming off of a harness.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1A:
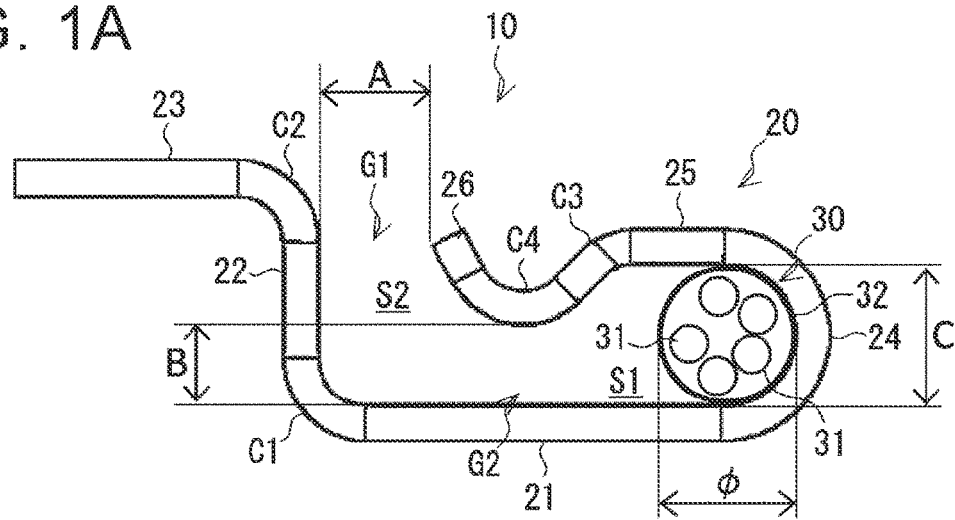
FIG. 1A is a sectional view of a harness clamp and a harness in a first clamp space.

Hereinafter, a harness clamp 10 according to an embodiment of the present disclosure will be described with reference to the accompanying drawings. Like reference numerals denote corresponding components in the drawings, and the description will not be repeated.

Figure 1B:
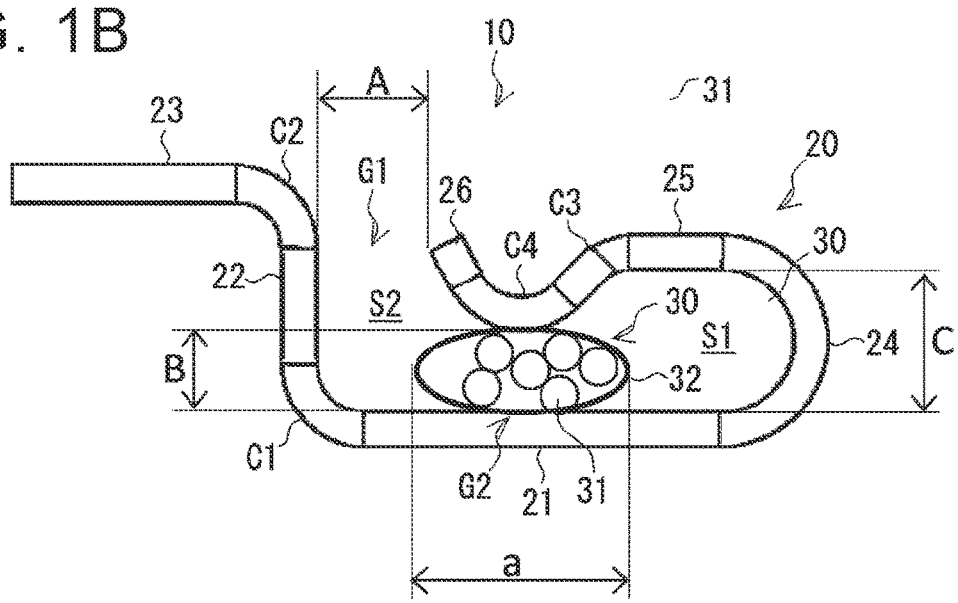
FIG. 1B is a sectional view of the harness clamp and the harness passing through a second gap.
Figure 1C:
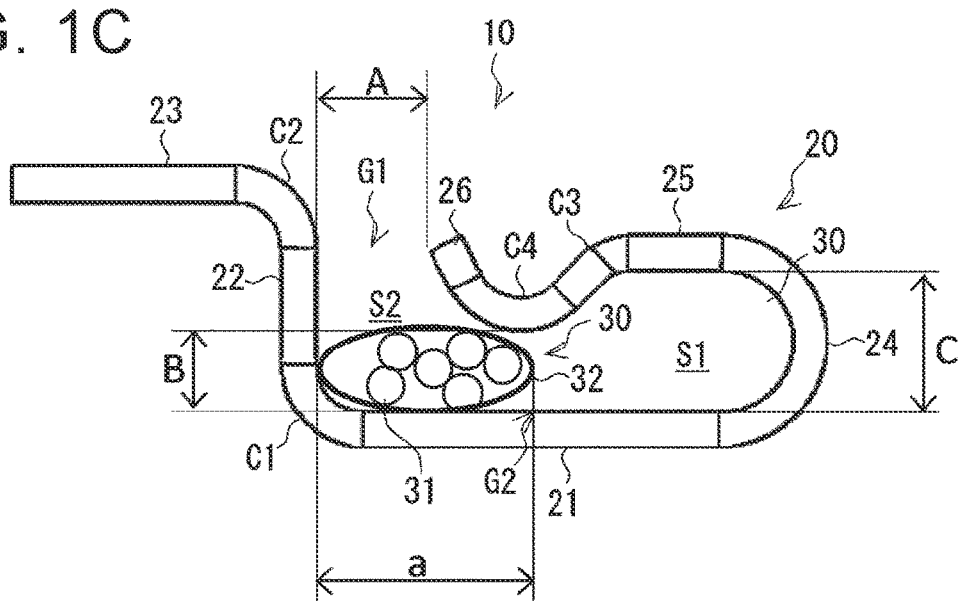
FIG. 1C is a sectional view of the harness clamp and the harness in a second clamp space.

FIG. 1A is a sectional view of the harness clamp 10 and a harness 30 in a first clamp space S1. FIG. 1B is a sectional view of the harness clamp 10 and the harness 30 passing through a second gap G2. FIG. 1C is a sectional view of the harness clamp 10 and the harness 30 in a second clamp space S2. FIG. 1A to FIG. 1C show a drive unit that includes a harness and a harness clamp. More specifically, the drive unit includes a motor, a rotation angle sensor, a harness, a harness clamp, and a case (fixing target 40) (not shown). The harness 30 is connected to the rotation angle sensor. The harness clamp 10 is attached to the case (fixing target 40) that accommodates the motor.

The harness clamp 10 is a bracket having the function of clamping the harness 30. As shown in FIG. 1A to FIG. 1C, the harness 30 includes a plurality of core wires 31 and a cylindrical sheath 32 having flexibility to sheathe the core wires 31. The core wires 31 are, for example, lead wires. The sheath 32 is, for example, an acrylic rubber tube. The harness clamp 10 has such a shape that suppresses coming off of the harness 30 from the harness clamp 10 as will be described later.

As shown in FIG. 1A to FIG. 1C, the harness clamp 10 includes a harness clamp body 20. The harness clamp body 20 includes a base part 21, an upright part 22, a fixing part 23, a folding back part 24, a first elongated part 25, and a second elongated part 26. The upright part 22 extends from one end of the base part 21 in a direction away from the base part 21 via a first bent part C1. The fixing part 23 extends from the distal end of the upright part 22 toward a side opposite to the base part 21 via a second bent part C2 and fixed (for example, fixedly screwed) to a fixing target. The folding back part 24 extends in a circular arc shape from the other end of the base part 21 and folded back. The first elongated part 25 extends substantially parallel to the base part 21 from the distal end of the folding back part 24 toward the upright part 22 and further extends in an oblique direction to approach the base part 21 via a third bent part C3 to form the first clamp space S1 between the base part 21 and the folding back part 24. The second elongated part 26 extends from the distal end of the first elongated part 25 in an oblique direction away from the base part 21 via a fourth bent part C4 to form the second clamp space S2 between the base part 21 and the upright part 22. The distal end of the second elongated part 26 is a free end.

The first clamp space S1 is a space to clamp the harness 30. The first clamp space S1 is formed by the base part 21, the folding back part 24, and the first elongated part 25. The second gap G2 is formed between the fourth bent part C4 and the base part 21. Where the length of the second gap G2 is B and the diameter of the harness 30 is φ, the relationship therebetween is B<φ. Where the diameter of the folding back part 24 is C and the diameter of the harness 30 is φ, the relationship therebetween is C≈φ. According to these relationships, the first clamp space S1 functions as a first clamp to clamp the harness 30 inserted in the first clamp space S1.

The harness 30 is inserted in the first clamp space S1 via the first gap G1 and the second gap G2.

Figure 2A:
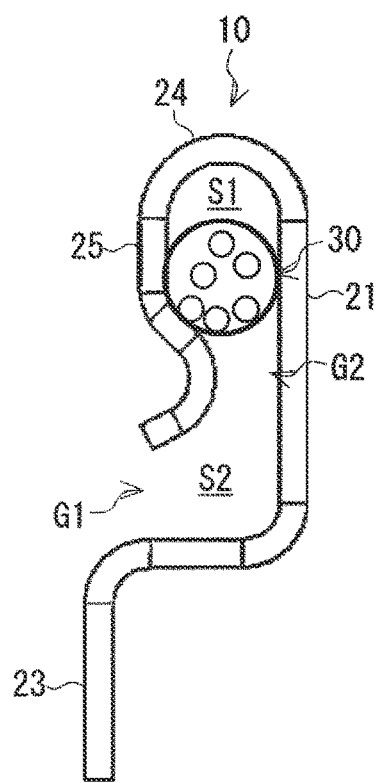
FIG. 2A is a sectional view of the harness clamp and the harness in the first clamp space.
Figure 2B:
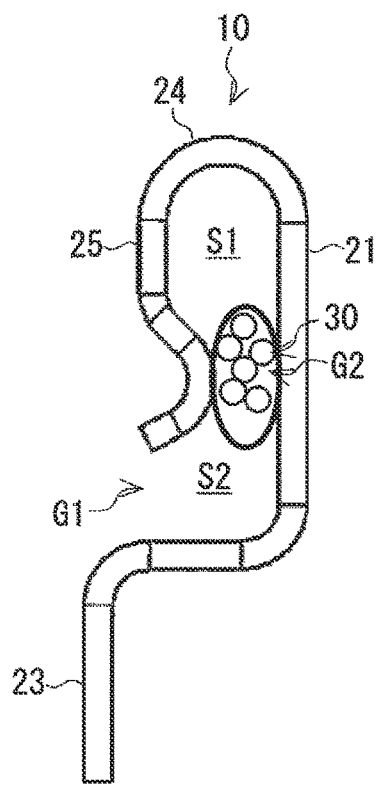
FIG. 2B is a sectional view of the harness clamp and the harness passing through the second gap.
Figure 2C:
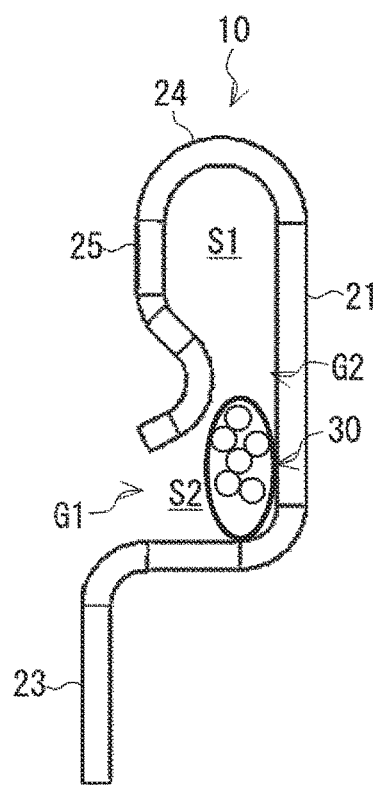
FIG. 2C is a sectional view of the harness clamp and the harness in the second clamp space.

When the harness clamp 10 is fixed to the vibrational fixing target, the harness 30 can pass through the second gap G2 due to the vibrations (harness coming off). Particularly, as shown in FIG. 2A to FIG. 2C, when the harness clamp 10 is fixed in a state where the folding back part 24 is disposed above and the fixing part 23 is disposed below, the harness clamp 10 comes under the influence of not only the vibrations but also its own weight, so the harness 30 is more easily able to pass through the second gap G2.

Therefore, the second clamp space S2 is provided.

The second clamp space S2 is a space to clamp the harness 30 (see FIG. 1C and FIG. 2C) deformed into an elliptical shape as a result of passing through the second gap G2. The second clamp space S2 is formed by the base part 21, the upright part 22, and the second elongated part 26. The first gap G1 is formed between the distal end of the second elongated part 26 and the upright part 22. Where the maximum diameter of the harness 30 deformed into an elliptical shape as a result of passing through the second gap G2 is a (see FIG. 1B) and the length of the first gap G1 is A, the relationship therebetween is A<a. According to this relationship, the second clamp space S2 functions as a second clamp to clamp the harness 30 (see FIG. 1C and FIG. 2C) deformed into an elliptical shape as a result of passing through the second gap G2 and moving into the second clamp space S2.

An example of fixing of the harness clamp 10 will be described.

Figure 3:
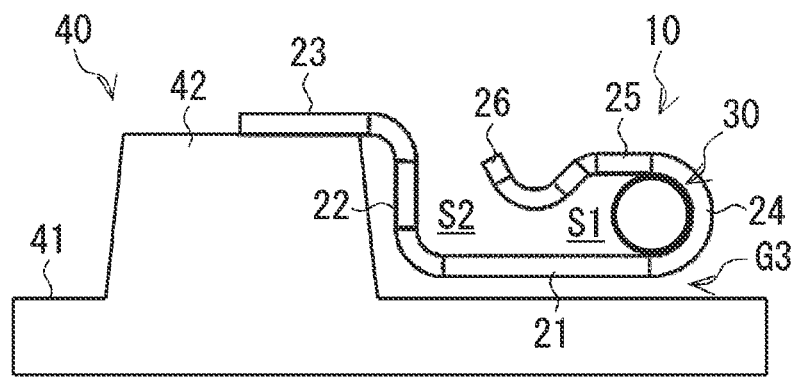
FIG. 3 is an example in which the harness clamp is fixed to a fixing target.

FIG. 3 is an example in which the harness clamp 10 is fixed to the fixing target 40. As shown in FIG. 3, by fixing (for example, fixedly screwing) the fixing part 23 to a projecting portion 42 (distal end) projecting from a wall surface 41 of the fixing target 40, it is possible to fix the harness clamp 10 to the wall surface 41 of the fixing target 40 in a noncontact state (that is, a gap G3 is formed between the base part 21 and the wall surface 41). Fixing the harness clamp 10 to the wall surface 41 of the fixing target 40 in a noncontact state in this way is to take measures against burrs from the wall surface 41 of the fixing target 40.

Figure 4:
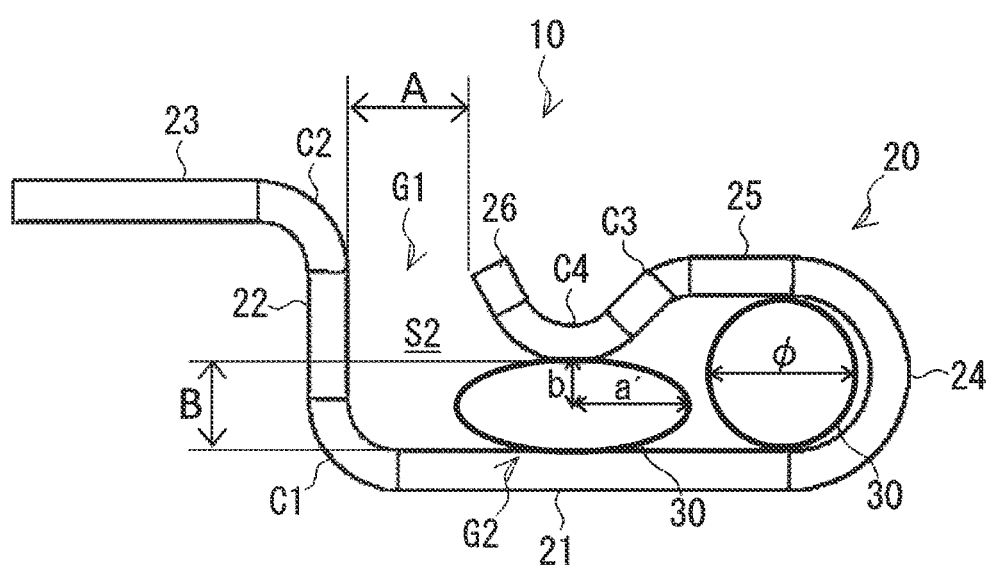
FIG. 4 is a view showing the relationship among parameters.

Instead of the above-described two expressions ((Second gap G2)<(Diameter φ of the harness 30), and (Length A of the first gap G1)<(Maximum diameter a of the harness 30 deformed into an elliptical shape as a result of passing through the second gap G2)), the following expressions 1 to 4 may be used. However, as shown in FIG. 4, A is the length of the first gap G1, B is the length of the second gap G2, a' is the major axis diameter (radius) of the harness 30 at the time of passing through the second gap G2, b is the minor axis diameter (radius) of the harness 30 at the time of passing through the second gap G2, and φ is the diameter of the harness 30. FIG. 4 is a view showing the relationship among parameters.

$$A < 2a' \tag{1}$$

$$2b = B \tag{2}$$

$$b < \phi/2 < a' \tag{3}$$

$$a'*b = (\phi/2)^2 \tag{4}$$

The expression 1 is a relational expression expressing retainment of the deformed harness 30. The expression 1 corresponds to the above-described expression ((Length A of the first gap G1)<(Maximum diameter a of the harness 30 deformed into an elliptical shape as a result of passing through the second gap G2)). The expression 2 is a relational expression expressing that the harness 30 deforms while being in contact with the harness clamp body 20 by the width of the second gap G2. The expression 3 is a relational expression expressing a state of the deformed harness 30. By substituting the expression 2 into the expression 3, the above-described expression ((Second gap G2)<(Diameter 4) of the harness 30)) is derived. The expression 4 is a relational expression expressing that the cross-sectional area of the harness 30 before deformation and the cross-sectional area of the deformed harness 30 are constant.

The expression 4 is obtained by omitting the circular constant 7C on each side on the assumption that the area of an ellipse ((Long side a')×(Short side b)×(Circular constant π))=the area of a circle ((Radius Φ)/2×(Radius Φ)/2×(Circular constant π)).

Here, by using the expression 2 and the expression 4, the long side b and the short side a' in a deformed state are able to be uniquely obtained from measured values A, B, φ as expressed by the following expression 5 and expression 6.

$$a' = 2*(\phi/2)^2 \div B \tag{5}$$

$$b = B/2 \tag{6}$$

Subsequently, when the expression 5 is substituted into the expression 1, the following expression 7 with only the measured values A, B, φ is able to be derived.

$$AB < \phi^2 \tag{7}$$

When the expression 6 is substituted into the expression 3, the following expression 8 with only the measured values A, B, φ is able to be derived.

$$B < \phi \quad (8)$$

As described above, by using the expression 4, the above-described two expressions 7 and 8 are able to be derived from only the measured values A, B, φ without using the parameter that "Maximum diameter a of the harness 30 deformed into an elliptical shape as a result of passing through the second gap G2". The two expressions are relational expressions not depending on the deformed shape.

As described above, according to the present embodiment, it is possible to suppress coming off of the harness 30. This is due to the fact that the harness clamp 10 is provided with a plurality of clamp functions, that is, the first clamp space S1 that functions as a first clamp and the second clamp space S2 that functions as a second clamp.

According to the present embodiment, it is possible to increase the flexibility of a bracket mounting state. In other words, the harness clamp 10 is able to be mounted (for example, fixed to an attachment target) with not only the position of FIG. 1A to FIG. 1C but also the position of FIG. 2A to FIG. 2C.

All the numeric values described in the above embodiment are illustrative and, of course, appropriate numeric values different from those numeric values may be used.

The above embodiment is only illustrative in all respects. The applicable embodiment should not be interpreted restrictively to the above embodiment. The present disclosure may be implemented in other various forms without departing from the spirit or main features thereof

What is claimed is:

1. A harness clamp comprising
a harness clamp body including:
    a base part;
    an upright part extending from a first end of the base part in a direction away from the base part via a first bent part;
    a fixing part extending from a distal end of the upright part toward a side opposite to the base part via a second bent part and fixed to a fixing target;
    a folding back part folded back from a second end of the base part;
    a first elongated part extending substantially parallel to the base part from a distal end of the folding back part toward the upright part and further extending in a direction to approach the base part via a third bent part; and
    a second elongated part extending from a distal end of the first elongated part in a direction away from the base part via a fourth bent part, a distal end of the second elongated part being a free end, wherein:
the distal end of the second elongated part and the upright part define a first gap;
the fourth bent part and the base part define a second gap;
the base part, the folding back part, and the first elongated part define a first clamp space, the first clamp space is a space in which a harness is held;
the base part, the upright part, and the second elongated part define a second clamp space, the second clamp space is a space in which the harness is deformed as a result of passing through the second gap from the first clamp space;
a length of the second gap is less than a diameter of the harness, and a length of the first gap is less than a maximum diameter of the deformed harness; and
the upright part extends substantially perpendicular to the base part.

2. The harness clamp according to claim 1, wherein:
the folding back part extends in a circular arc shape; and
a diameter of the folding back part is substantially equal to the diameter of the harness.

3. The harness clamp according to claim 1, wherein the harness clamp body is manufactured by bending a metal plate.

4. The harness clamp according to claim 1, wherein the fixing part extends substantially parallel to the base part.

* * * * *